United States Patent [19]

Bausch et al.

[11] Patent Number: 4,741,408
[45] Date of Patent: May 3, 1988

[54] POWER STEERING SYSTEM FOR MOTOR VEHICLES

[75] Inventors: Paul Bausch, Hattenheim; Klaus-Peter Harth, Florsheim, both of Fed. Rep. of Germany

[73] Assignee: General Motors Corporation, Detroit, Mich.

[21] Appl. No.: 898,993

[22] Filed: Aug. 22, 1986

[30] Foreign Application Priority Data

Dec. 14, 1985 [DE] Fed. Rep. of Germany ....... 3544350

[51] Int. Cl.$^4$ .............................................. B62D 5/04
[52] U.S. Cl. ..................................................... 180/79.1
[58] Field of Search ..................... 180/79.1, 142, 133; 192/58 C, 58 B

[56] References Cited

U.S. PATENT DOCUMENTS

| | | | |
|---|---|---|---|
| 4,027,755 | 6/1977 | Evans et al. | 192/58 C X |
| 4,471,280 | 9/1984 | Stack | 180/79.1 X |
| 4,556,116 | 12/1985 | O'Neil | 180/79.1 |
| 4,576,056 | 3/1986 | Barthélemy | 180/79.1 |
| 4,582,155 | 4/1986 | Ohe | 180/79.1 |
| 4,588,060 | 5/1986 | Norton | 180/79.1 X |
| 4,593,780 | 6/1986 | Saito | 180/79.1 |

FOREIGN PATENT DOCUMENTS

| | | | |
|---|---|---|---|
| 1119799 | 6/1956 | France | 180/79.1 |
| 2408501 | 7/1979 | France | 180/79.1 |
| 2507142 | 12/1982 | France | 180/79.1 |
| 2579547 | 10/1986 | France | 180/79.1 |
| 59-11965 | 1/1984 | Japan | 180/79.1 |
| 1182816 | 3/1970 | United Kingdom | 180/79.1 |

Primary Examiner—Richard A. Bertsch
Assistant Examiner—Charles R. Watts
Attorney, Agent, or Firm—Mark A. Navarre

[57] ABSTRACT

A power steering system for motor vehicles for assisting the manual steering effort includes an electromotive drive unit which acts upon the steering shaft in a sense corresponding to that of the manual steering. The operating mode of the drive unit is dependent on the vehicle speed and the instantaneous steering torque manually applied to the steering wheel. At low vehicle speeds and high manual steering torque the drive unit is caused to run at high speeds; at high vehicle speeds and low manual steering torque the drive unit is caused to run at low speeds. A fluid friction clutch is interposed between the drive unit and the steering shaft. In addition to transmitting force from the drive unit to the steering shaft, the fluid friction clutch assists in damping forces which are transmitted to the steering wheel by the steering system in the form of shocks or rotary oscillations.

2 Claims, 2 Drawing Sheets

POWER STEERING SYSTEM FOR MOTOR VEHICLES

This invention relates to a power steering system for motor vehicles wherein the manual steering effort expended by the driver is assisted by an electromotive drive unit which acts upon the steering shaft in the same fashion as the manual steering force, and wherein the mode of operation of the drive unit not only depends on the vehicle speed, but also on the instantaneous torque applied to the steering wheel by the manual steering effort.

Motorized servo steering systems have heretofore been provided to augment the manual forces applied to the steering wheel. These steering forces to be applied by the driver are relatively great during low vehicle speeds, and especially during parking maneuvers. According to the present state of the art, the power is furnished by electric motors and is transmitted via a power train and complicated clutches to the rotating parts of the steering gear mechanism. However, this type of power transmission mechanism is unduly complex in design and occupies a relatively large amount of space.

Another traditional approach to augment the manual steering effort needed for parking has been the employment of hydraulic servo mechanisms, which are also relatively complex in design. What is more, this type of servo mechanism is rarely needed under normal driving conditions but is constantly using up some of the engine power.

In another approach, a drive unit comprising an electric motor is intermittently activated and deactivated according to the instantaneous manual steering torque and the vehicle speed. The motor and a succeeding gear mechanism may be integrated into the steering column or the steering shaft of the steering mechanism.

It is the object of the present invention to provide a servo steering system of the type described in the foregoing which is characterized by its simplicity of construction, low weight and economy of manufacture, but which nevertheless performs its functions effectively and reliably.

According to the invention, this object is accomplished in that speed regulating means are provided for the electromotive drive unit, the arrangement being such that at low vehicle speeds and high manual steering torque the speed of the servo drive unit will be relatively high, and at high vehicle speeds and low manual steering torque, the speed of the unit will be relatively low, and in that a fluid friction clutch is interposed between the servo drive unit and the steering shaft.

Thus, the operating principle of the subject power steering system is not limited to the function of simply activating and deactivating the electromotive drive unit. Instead, the power assist torque furnished by the drive unit can be apportioned in an infinitely variable manner because, in accordance with the invention, the speed of the electric motor is being regulated. The fluid friction clutch according to the invention is designed so that the torque transmitted thereby is increasing as the difference of the RPM between the inner and outer clutch disks increases. This feature will enable to provide increased power assist at high speeds of the drive unit and to apportion a correspondingly lower power assist at low speeds of the drive unit.

Fluid friction clutches (also called viscous clutches) per se are generally known in the art and are not a subject of the present invention. The present invention, or at least a substantial portion thereof, is directed towards the use of a fluid friction clutch in a motor vehicle steering system as a component of a power steering assembly.

In addition to cost and weight savings, one important advantage of the arrangement according to the invention is that with the subject steering system the steering effort during parking is considerably reduced, but steering becomes more direct as the vehicle speed increases. At the same time, the fluid friction clutch assists in damping the forces which may be transmitted to the steering wheel via the steering system in the form of shocks or rotary oscillations.

In accordance with a preferred embodiment, which is characterized by its compactness and its low weight, and which is comprised of a relatively low number of parts, it is proposed that the fluid friction clutch be integrated into the steering column, the arrangement being such that the inner clutch plates are affixed to the steering shaft, and the clutch housing carrying the outer clutch disks is rotatably mounted on the steering shaft or another part of the steering column, and that rotational motion is imparted to the clutch housing by the drive unit.

According to a further feature of the invention there are provided sensors for picking up the instantaneous manual steering torque information. These sensors are in the form of expansion-type measuring strips which are arranged in the steering wheel. The instantaneous vehicle speed is picked up by a device which may be operatively associated with the speedometer drive shaft or any suitable component in the drive gear.

The invention will become apparent from the following description of the attached drawings which illustrate preferred exemplary embodiments.

IN THE DRAWINGS

Figure 1:
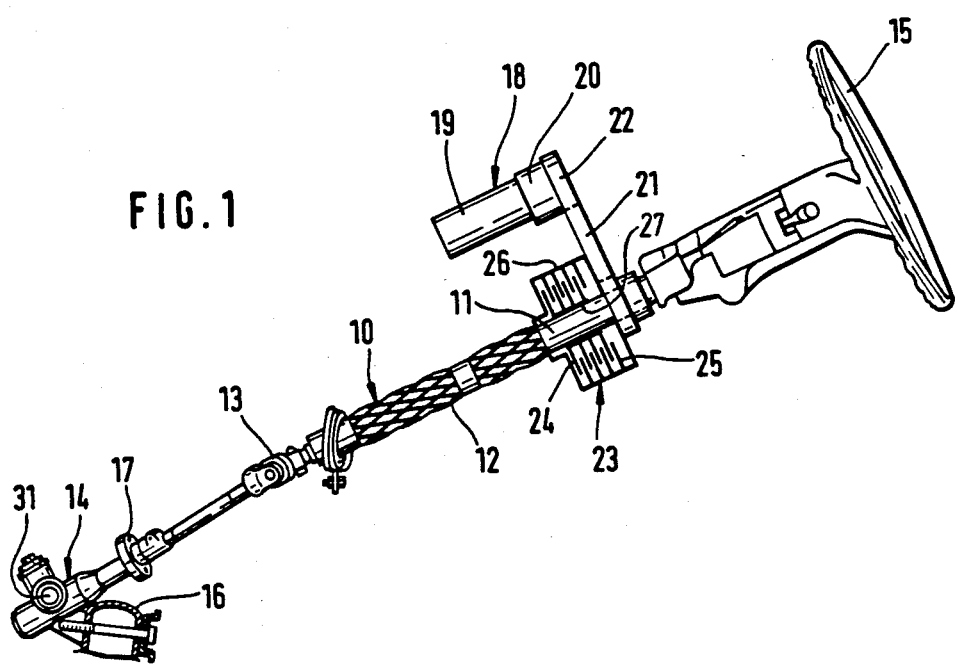
FIG. 1 is a schematic side elevational view of a steering system with a power assist system for use in a passenger car.

In FIG. 1, the reference numeral 10 designates the steering column with steering shaft 11, energy absorbing means 12, universal joint 13 and steering gear mechanism 14 of a passenger car. Steering shaft 11 is actuated by a steering wheel denoted by the numeral 15. The steering gear mechanism 14 is of the rack and pinion type and is supported by a transverse member 16 which is part of the vehicle substructure. The vehicle substructure per se is not illustrated in the drawings. The torque furnished by the steering assist means is transmitted from the steering shaft 11 to the steering gear mechanism 14 via a vibration-damping joint 17.

In order to be able to augment under certain vehicle operating conditions the steering torque which is applied manually to the steering wheel 15, there is provided a drive unit which is indicated in its entirety by the numeral 18. The drive unit 18 comprises a direct current motor 19 and an integrated planetary gear mechanism 20. The power furnished by the drive unit 18 is transmitted to the steering shaft via a poly-V or toothed belt 21 which is driven by the drive pinion 22 of the planetary gear 20. Instead of a belt drive, it is also possible for the power to be transmitted by a chain drive or any other suitable constant ratio drive transmission means.

However, the power is not being transmitted directly from the drive unit 18 to the steering shaft 11, but instead via a so-called fluid friction clutch 23, also termed "viscous clutch", which is interposed therebetween. The fluid friction clutch 23 transmits torque via fluid interface between two sets of radially interleaved clutch disks 24, 25 which are arranged inside of a sealed clutch housing 26 filled with a viscous fluid. The inner clutch disks 24 are affixed to the steering shaft 11 by spline key connection 27, whereas the outer clutch disks 25 are rigidly connected to the clutch housing 26. The clutch housing 26, together with the outer clutch disks 25, is mounted for rotation relative to the inner clutch disks 24. As indicated in FIG. 1, the clutch housing 26 may be mounted directly on the steering shaft 11 or on a tubular jacket of the steering column 10 surrounding the steering shaft 11. Whatever the arrangement, it is advisable that bearing means be provided for the housing on either side of the clutch disk sets 24, 25.

Figure 2:
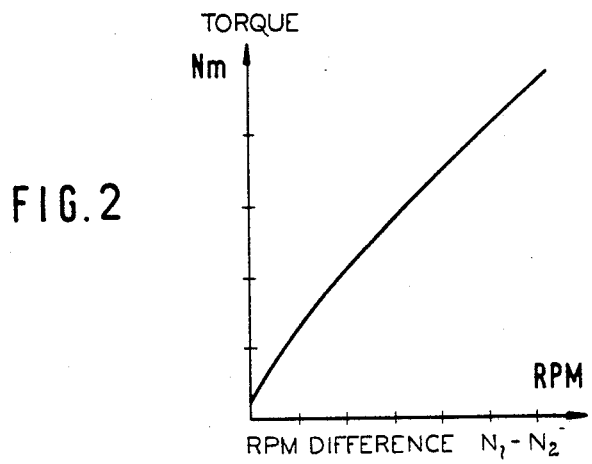
FIG. 2 is a graph illustrating the characteristics of the fluid friction clutch of FIG. 1. The servo torque is plotted as a function of the speed differential ($N_1 - N_2$) of the clutch disks.

If rotational motion is imparted by the electromotive drive unit 18 to the clutch housing 26, the outer set of clutch disks 25 will be caused to rotate at a speed $N_1$. The speed of the inner clutch disks 24 is designated as $N_2$. The magnitude of the torque transmitted by the outer set of clutch disks 25 to the inner set of clutch disks 24 and thus to the steering shaft 11 depends, as shown in FIG. 2, on the speed difference $(N_1 - N_2)$. Therefore, the greater the difference $(N_1 - N_2)$, the higher will be the torque that is transmitted to the steering shaft 11.

The RPM difference $(N_1 - N_2)$ is controlled by causing variations to occur in the drive speed $N_1$ which, in turn, is effected by regulating the speed of the DC motor 19. The speed of the DC motor 19 is varied in relation to the steering torque manually applied by the driver to the steering wheel 15. In this way, the assist torque applied to the toothed rack 31 is varied in relation to the torque applied manually by the driver to the steering wheel 15. For this purpose, the steering wheel 15 has expansion-type measuring strips (not shown) mounted therein which are adapted to provide an electrical signal indicative of the instantaneous steering torque.

However, the DC motor 19 and thus the speed $N_1$ must not only be controllable in response to the steering torque, but must also be controllable as a function of the vehicle speed. This is accomplished by a device (not shown) which measures the vehicle speed at a suitable place, e.g., the speedometer cable or the drive train, and converts this information into electrical signals which are used to control the electric motor 19.

Figure 3:
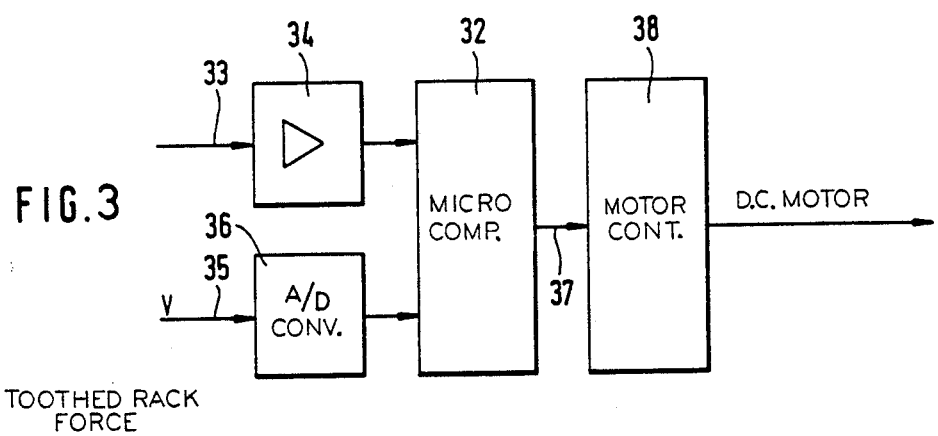
FIG. 3 is a schematic block diagram of an electronic control circuit for the servo steering unit of FIG. 1.

Obviously, the task of controlling the speed of the DC motor on the basis of two output signals (steering torque and vehicle speed) requires suitable means to coordinate the measured values, and this coordinating means is preferably in the form of a microcomputer, as shown in FIG. 3. The steering torque signal on line 33 is fed by way of an amplifier 34 to a microcomputer 32. The vehicle speed signal on line 35 is fed by way of analog-to-digital (A/D) converter 36 to the microcomputer 32. The output of the microcomputer 32 on line 37 is fed into a motor controller 38 which controls the speed on the DC motor 19 through corresponding voltage signals.

Figure 4:
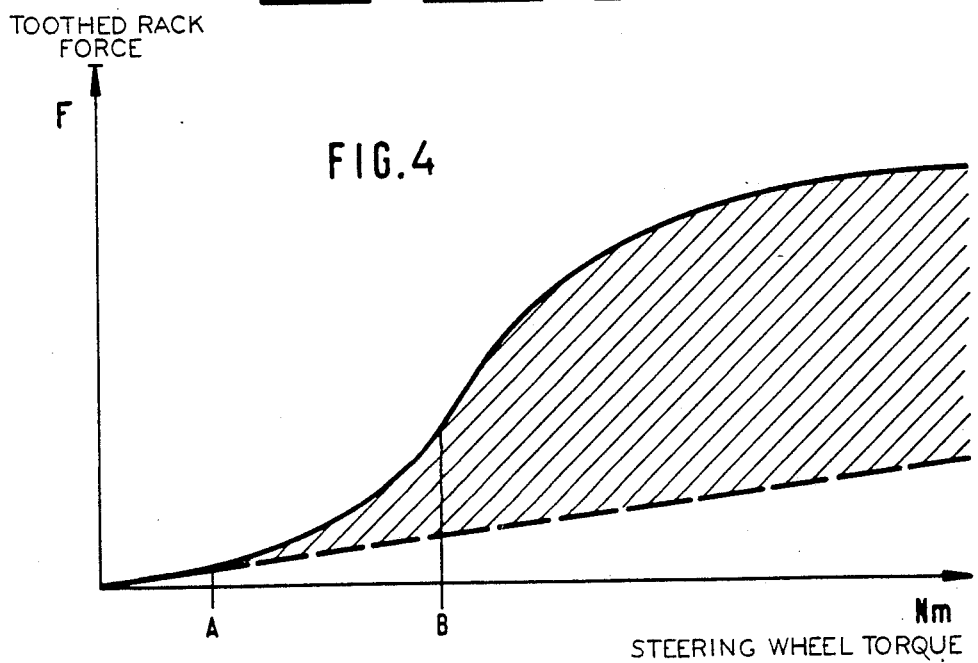
FIG. 4 is a graph of the control characteristic of the servo steering unit of FIG. 1. The rack force F is plotted as a function of the steering torque applied manually to the steering wheel.

With the arrangement described in the foregoing, the RPM ($N_1$) transmitted by the DC motor 19 to the fluid friction clutch 23 always corresponds to a value that is a function of both the steering force and the vehicle speed. The characteristic toothed rack force vs. steering wheel torque curve of FIG. 4 illustrates that the force F on the toothed rack increases linearly up to a relatively low steering torque value "A" without power assist. This flat and uniform ascent of the curve is strictly a function of steering gear ratio and steering wheel torque. Starting at point A, the force on the toothed rack increases more rapidly as a result of the power assist which is now being furnished by the drive unit 18 and the fluid friction clutch 23. This portion of the diagram is active for negotiating curves during normal driving. The driver applied steering wheel torque exceeds the relatively high steering torque value "B" primarily at speeds of 10 mph or lower, i.e., especially during parking. In such case, the power assist effect generated by the drive unit 18 in combination with the fluid friction clutch 23 will rise very rapidly as shown.

The embodiments of the invention in which an exclusive property or privilege is claimed are defined as follows:

1. Electromotive drive apparatus for supplying power assist torque to a motor vehicle steering shaft adapted to receive manually supplied steering torque, comprising:
    variable speed motor means;
    viscous drag clutch means connected between the variable speed motor means and the steering shaft to establish a passive and unregulated coupling therebetween; and
    control means for sensing the manually supplied steering torque and controlling the speed of the variable speed motor means in relation thereto, thereby to supply power assist torque in relation to the manually supplied steering torque.

2. The apparatus set forth in claim 1, wherein the viscous drag clutch means comprises:
    inner clutch disk means rigidly secured to the steering shaft for rotation therewith;
    clutch housing means rotatably mounted with respect to the steering shaft and connected to be rotatably driven by said variable speed motor means; and
    outer clutch disk means rigidly secured to the clutch housing and interleaved with the inner clutch disk means.

* * * * *